United States Patent Office.

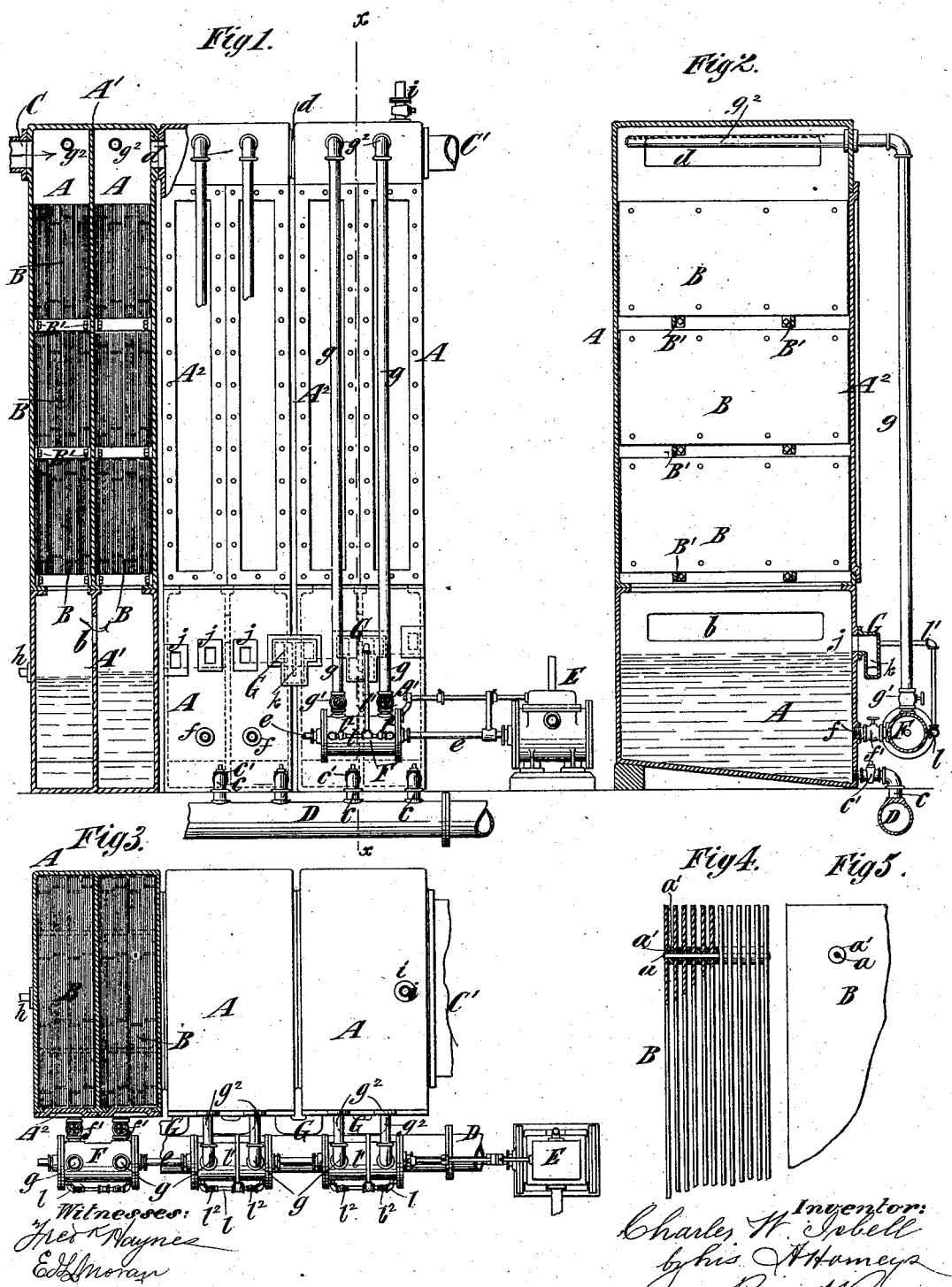

CHARLES W. ISBELL, OF NEW YORK, N. Y.

GAS-SCRUBBER.

SPECIFICATION forming part of Letters Patent No. 292,491, dated January 29, 1884.

Application filed November 29, 1882. (No model.)

*To all whom it may concern:*

Be it known that I, CHARLES W. ISBELL, of the city and county of New York, in the State of New York, have invented a new and useful Improvement in Gas-Scrubbers, of which the following is a specification.

My invention relates to wet gas-scrubbers or washers composed of a number of chambers or compartments through which the gas and the water pass successively, and preferably in opposite directions, and in which the water or ammoniacal liquor is maintained at different levels in the different chambers, and overflows from one chamber to the other. In such scrubbers the object is not only to wash and scrub the gas, but also to obtain a highly-concentrated ammoniacal liquor, which is advantageous, both because it has a greater commercial value as a waste product of gas manufacture, and because the more highly concentrated the liquor is the greater its affinity for the sulphur in the gas and the less the final purification of the gas by lime that is required. In such scrubbers the gas, in its passage through said chambers, passes over surfaces which are wet with the ammoniacal liquor, and such surfaces are formed by groups of thin sheet-metal plates set at a very little distance apart in the groups, whereby a great extent of surface is afforded.

The principal objects of my invention are to simplify the construction of scrubbers of the class above mentioned; to afford convenient access to the interior of the scrubber, for the purpose of removing and replacing the groups of sheet-metal plates; to afford convenient access from the exterior of the scrubber to the overflow boxes or passages, whereby the liquid passes from one chamber to another, and the proper level is maintained in the several chambers; and to enable the scrubber to be readily added to or enlarged in size at any time by simply adding one or more chambers and contained groups of sheet-metal plates.

To these ends my invention consists in the combination, in a scrubber, of a number of upright chambers, each containing plates arranged in stationary groups, and provided with openings through which they communicate directly with each other, alternately, above and below said groups of plates, whereby the gas is caused to pass upward through the plates of one chamber and downward through the plates of the next chamber throughout the series; overflow boxes or openings between the chambers for maintaining the desired level of liquor in each, and means for raising the liquor from the top of said chambers, so that the plates will be kept constantly wet by the descent of liquor between them. The aforesaid chambers preferably have their overflow-openings in their outer sides, and the openings of adjacent chambers are connected by a box or conduit, which may be taken off without breaking any other joints, and which forms a trap to prevent the gas from blowing through. For convenience of construction, the chambers are formed in pairs, each pair forming a distinct and separate structure, and connecting with the chambers of adjacent pairs only by nozzles for the passage of gas, and overflow boxes and traps.

The invention also consists in the combination, with the pairs of chambers, of a novel arrangement of double-acting pumps—one for each pair of chambers—whereby the ammoniacal liquor is circulated from the bottom to the top of the chambers, and whereby provision is afforded for varying the rapidity of the circulation in the several chambers, and the degree of concentration of the liquor in the several chambers controlled.

The invention also consists in various details of construction and combinations of parts, hereinafter described.

In the accompanying drawings, Figure 1 represents a partly-sectional elevation of a scrubber embodying my invention. Fig. 2 represents a section thereof on the dotted line $x\ x$, Fig. 1. Fig. 3 represents a plan and partial horizontal section of the scrubber; and Figs. 4 and 5 represent sectional detail views upon a larger scale, showing the method of forming the groups of sheet-metal plates.

Similar letters of reference designate corresponding parts in all the figures.

A designates upright chambers, which may be of any size and shape desired, and of which any number may be used to form a scrubber of the desired size. As here represented, these chambers are formed in pairs, and each pair constitutes a distinct and separate structure, which may be made of cast or wrought iron. The two chambers of each pair are separated from each other by a partition, A'.

Within the chambers A are arranged plates B, of any suitable material, preferably thin sheet metal, which are arranged very near together, and which entirely fill the chambers, as shown in Fig. 3.

The manner of securing the plates together is represented in Figs. 4 and 5, they being secured in groups by rivets $a$, and having washers $a'$ interposed between them to hold them at the desired distance apart. The plates may, however, be secured in groups in any suitable way.

As here represented, the groups of plates B are arranged in three banks or tiers, and are supported on girders B'; but more or less than three tiers may be used, according to the height of the scrubber.

C designates the gas-inlet, which communicates with the chamber A at one end of the scrubber above the plates B therein; and C' designates the gas-outlet leading from the chamber at the opposite end of the scrubber above the plates therein.

In each partition A', which separates the chambers of each pair, is a hole or opening, $b$, below the plates in the chambers, and through which the chambers communicate directly. The chambers A of each pair communicate directly, by means of nozzles or openings $d$, with the chambers of adjacent pairs above the plates B in the chambers. The several chambers may all rest upon the same foundation, as shown, and may have inclined bottoms, as shown in Fig. 2, so that the tar will all drain to one side, and each chamber communicates, through a pipe, $c$, provided with a valve or cock, $c'$, with a common conduit, D, for carrying off the tar.

I will now describe the means employed for producing a circulation of ammoniacal liquor in the scrubber, premising, however, that other mechanism may be used for the purpose.

E designates the steam or motor cylinder of a direct-acting engine, and F designates double-acting pump-cylinders, one of which is employed in connection with each pair of chambers. The pistons of the steam-engine and pumps are or may be all attached to a common piston-rod, $e$. Each pump is double-acting, and the ends of its cylinder are connected by suction-pipes $f$ with the lower portion of the two chambers of each pair, and by the discharge-pipes $g$ with the upper part of both chambers of said pair.

In the suction-pipes $f$ are check-valves $f'$, provided with screws, whereby they may be more or less throttled or held closed altogether, or with ordinary stop-cocks; and in the discharge-pipes $g$ are valves or cocks $g'$. The upper end of each discharge-pipe $g$ enters the chamber, and has a horizontal extension, $g^2$, which is perforated, and the perforations are preferably in the top or upper side thereof, so that the liquor will be discharged with considerable velocity against the top of chamber, and thereby sprayed over all the groups of the plates B. The liquor trickles down over said plates and keeps their surfaces constantly wet, and returns again to the bottom of the several chambers. The gas enters at the inlet C and passes downward through and among the groups of plates in the first chamber; thence through the opening $b$ to the other chamber of the pair, and upward through and among the groups of plates of that chamber; thence through the nozzle or opening $d$ to the first chamber of the next pair, and so on, until it makes its exit at the outlet-pipe C'. It will be seen that in its passage through the scrubber, the gas passes again and again over the constantly-wet surfaces of the plates B, and is freed from its sulphur and other impurities, which the ammoniacal liquor will remove. Each chamber has upon its side a cover or bonnet, $A^2$, and when the cover is removed access is afforded to all the groups of plates in the chamber, and they may be removed for cleaning or for renewal, and as readily replaced.

From the chamber A, which is provided with the gas-inlet C, there extends a discharge or outlet pipe, $h$, for the concentrated ammoniacal liquor, and in order to maintain the desired quantity in the several chambers the chamber at the opposite end of the scrubber is provided at the top with the inlet-pipe $i$.

On the sides of the several chambers A are overflow openings or apertures $j$, and the openings or apertures of adjacent chambers are connected by overflow-boxes G, bolted to the sides of the chambers, so that they may be readily removed in case they become clogged, or for any other purpose, without breaking any other joints.

As best shown in Fig. 1, the several overflow-boxes G are set at different levels, grading from the right downward toward the left, and thereby the liquor is made to flow toward the left in its passage through the scrubber, while the gas flows in the opposite direction, or toward the right; hence the gas as it enters comes first in contact with the most highly-concentrated liquor.

The overflow-boxes G are provided with central partitions, $k$, which enable them to serve as traps, and so prevent gas from blowing through and compelling the gas to pass upward and downward through the chambers for treatment successively by weaker and weaker liquor.

In order to vary or control the degree of concentration which takes place in the several chambers, the speed of the engine may be increased or diminished; or the amount of liquor raised by the pumps may be varied by opening or closing the valve $f'$ in the suction-pipe $f$. In case it is desirable to put one pump or either end of same entirely out of action, I provide each pump F with a pipe, $l$, connecting its ends and communicating with a pipe, $l'$, which leads from the gas-space of the scrubber, it being attached to the upper part of one of the overflow-boxes G, or to the chamber below the plates B. In the pipe $l$ are cocks or valves $l^2$, and by closing the valve $f'$ in the suction-pipe $f$, and $g'$ in the discharge-pipe $g$, and opening the valves $l^2$, the pump will be made to draw gas from the scrubber and deliver it through the pipes $l\ l'$, thus pumping gas instead of liquor.

It will be seen that any number of chambers or pairs of chambers may be combined to form a scrubber, and at any time other chambers can be bolted onto the nozzles $d$ and connected with the existing chambers and with each other by overflow-boxes G. Thus I provide for very readily increasing the size of the scrubber.

If more chambers are added at any time, each pair of chambers should be provided with a pump-cylinder, F, and the piston thereof should be connected with the common piston-rod $e$; or each chamber may have its own pump.

What I claim as my invention, and desire to secure by Letters Patent, is—

1. In a wet-scrubber, the combination of a number of upright chambers, each containing plates arranged in stationary groups, and provided with openings through which they communicate with each other directly, alternately above and below said groups of plates, whereby the gas is caused to pass upward through the plates of one chamber and downward through the plates of the next chamber throughout the series, overflow boxes or openings for maintaining the desired level of liquor in the several chambers, and means for raising liquor from the bottom to the top of said chambers, so as to obtain a highly-concentrated ammoniacal liquor, substantially as and for the purpose herein described.

2. In a scrubber, the combination of a number of upright chambers, each containing plates arranged in stationary groups and provided with openings through which they communicate with each other alternately above and below said groups of plates, overflow openings or apertures in the outer sides of said chambers, and overflow-boxes connecting the openings or apertures of adjacent chambers on the exterior of the scrubber, substantially as and for the purpose herein described.

3. In a scrubber, the combination of chambers containing groups of plates and arranged in pairs, the several pairs forming separate and distinct structures, which are connected together by communicating openings or nozzles above said plates, and the chambers of each pair being in communication below said plates, overflow-boxes connecting the chambers below said plates, and means for raising liquor from the bottom to the top of said chambers, substantially as and for the purpose herein described.

4. In a gas-scrubber, the combination, with two upright chambers containing groups of plates, and provided with overflow-boxes for controlling the level of ammoniacal liquor in them, of a double-acting circulating-pump having the chambers connected below said plates by suction-pipes with the opposite ends of the pump-cylinder, and connected above said plates by discharge-pipes with opposite ends of the pump-cylinder, whereby one pump is made to serve for both chambers, substantially as and for the purpose herein described.

5. In a scrubber, the combination of pairs of upright chambers containing groups of plates, and provided with overflow-boxes for controlling the level of ammoniacal liquor in them, and a double-acting circulating-pump for each pair of chambers having the suction and discharge of the two ends of the cylinder communicating with the said two chambers, and having pipes leading from the gas-space of the scrubber to the ends of the pump-cylinder, substantially as and for the purpose herein described.

CHAS. W. ISBELL.

Witnesses:
  FREDK. HAYNES,
  ED. L. MORAN.